Figure 1:
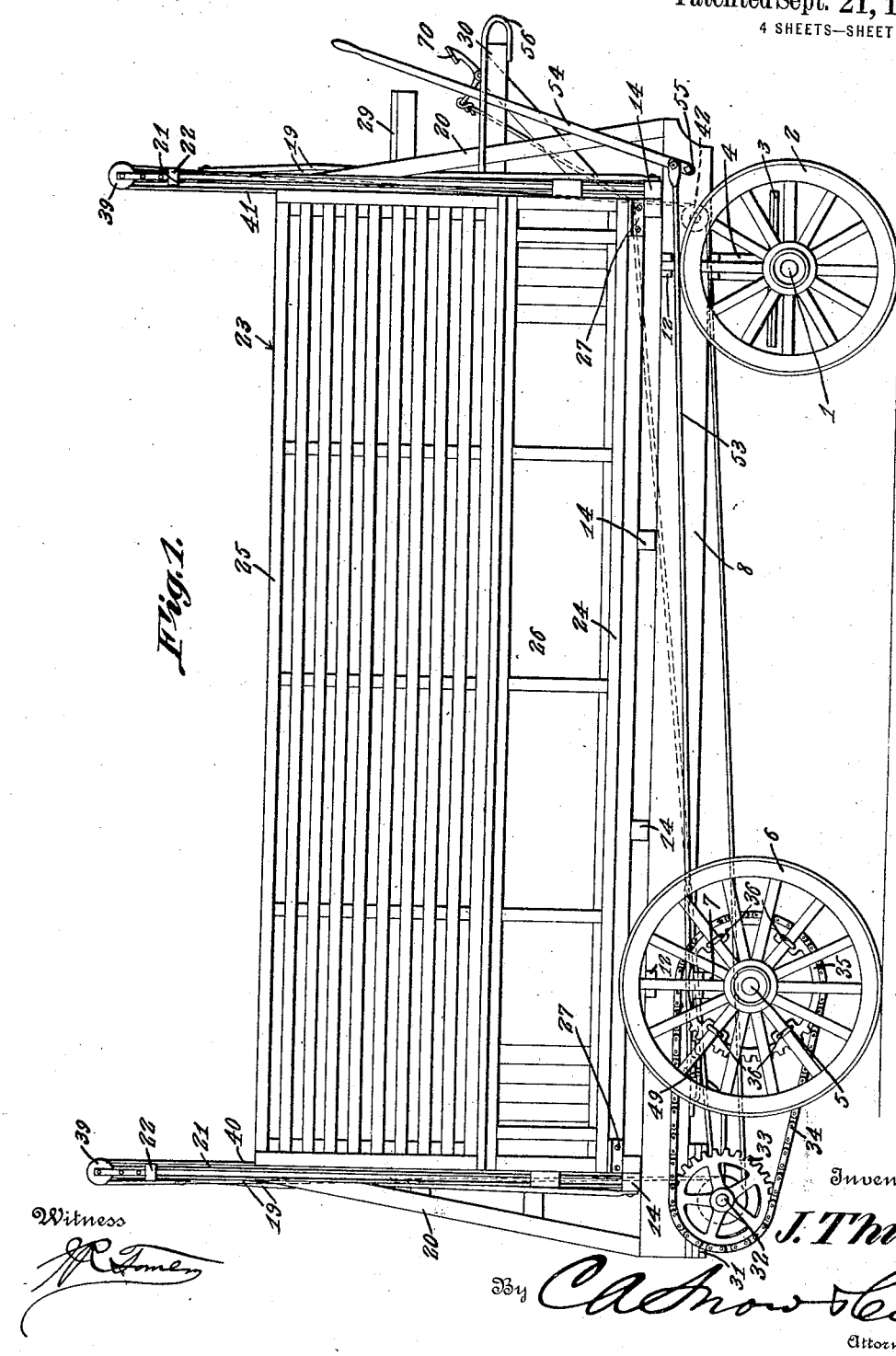

J. THIES.
BARGE.
APPLICATION FILED OCT. 25, 1919.

1,353,190.

Patented Sept. 21, 1920.
4 SHEETS—SHEET 1.

Witness

Inventor
J. Thies,
By C. A. Snow & Co.
Attorneys

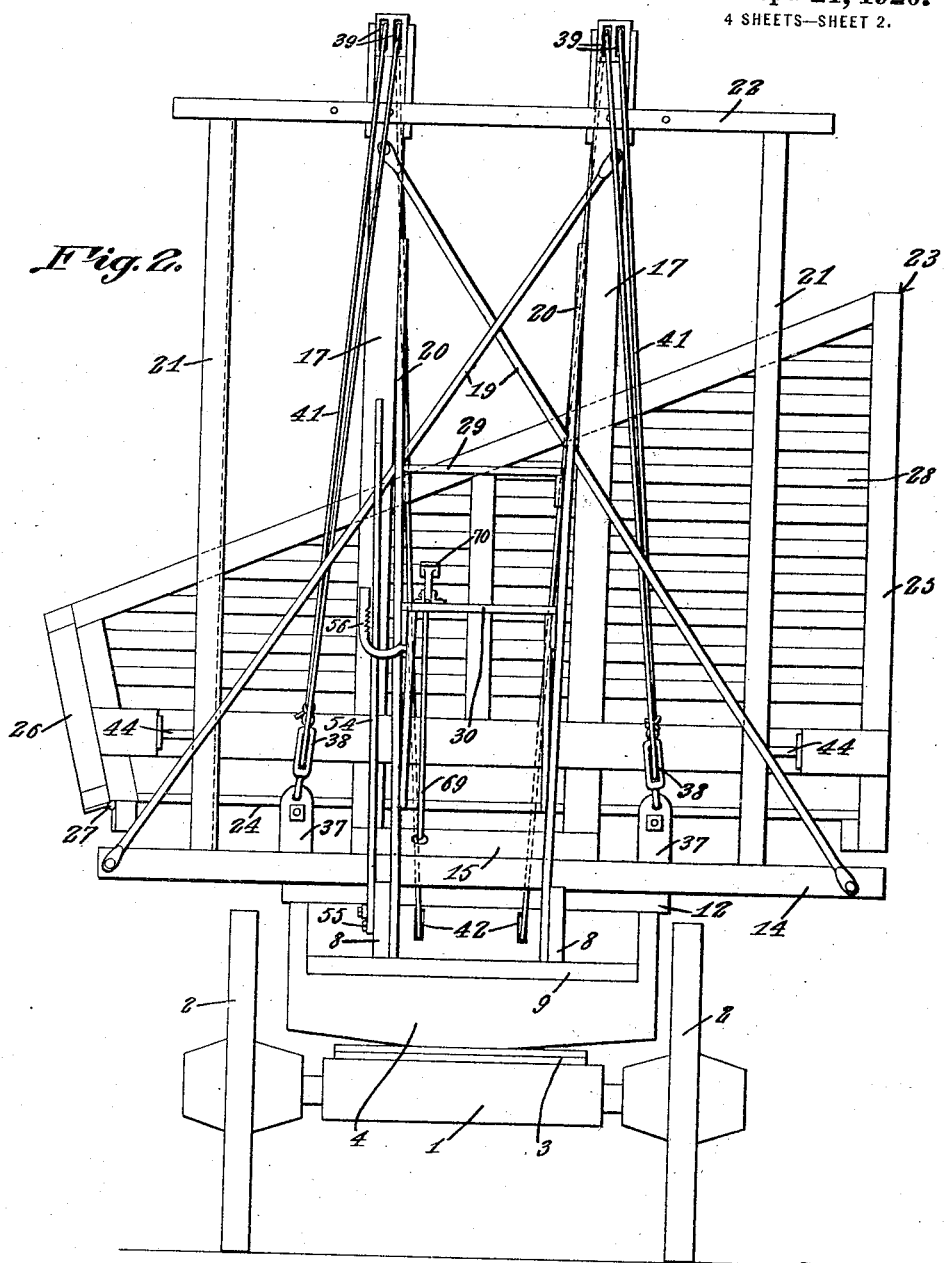

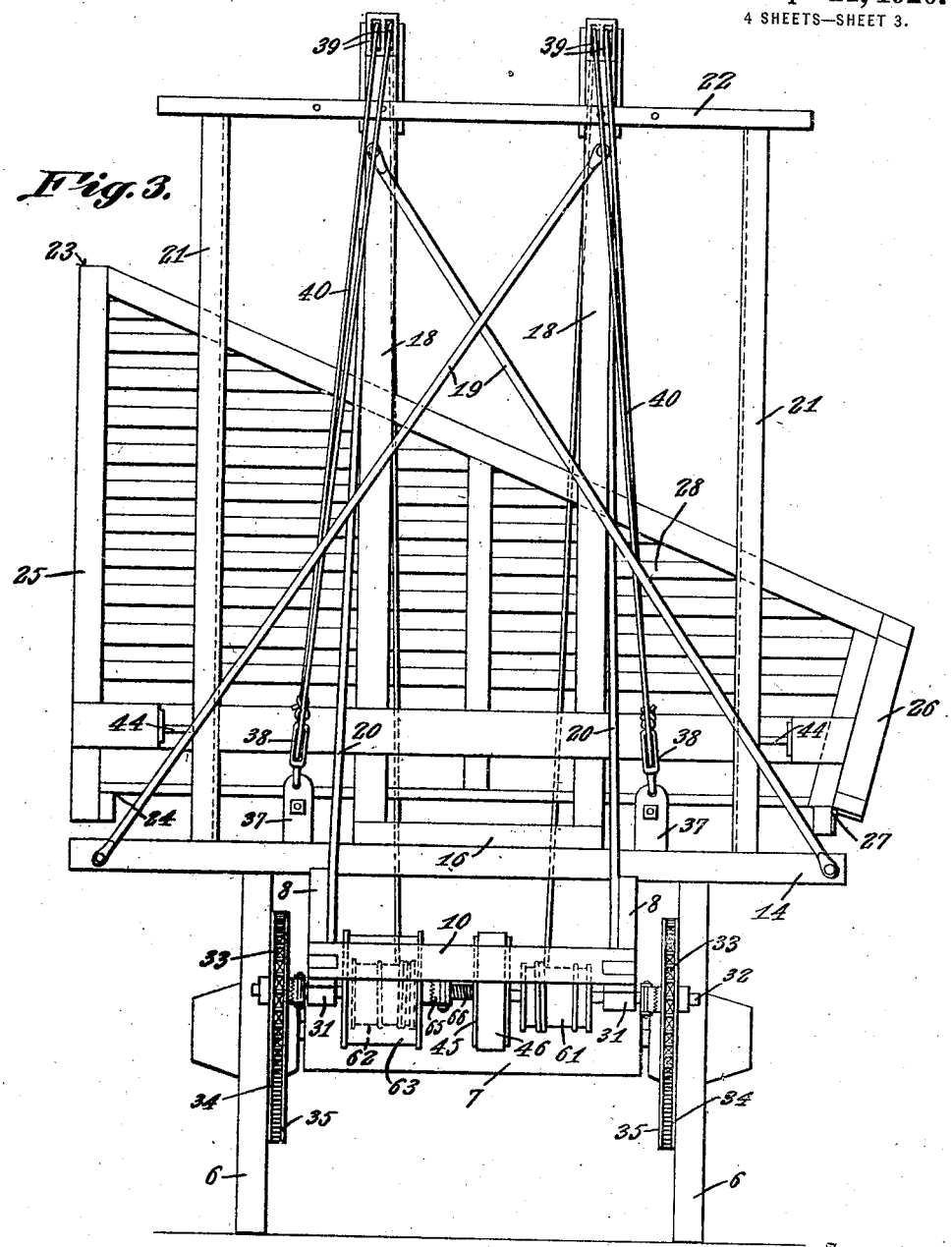

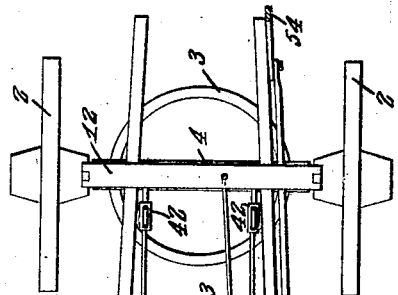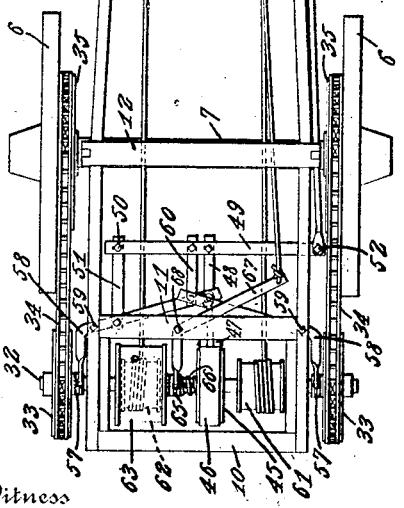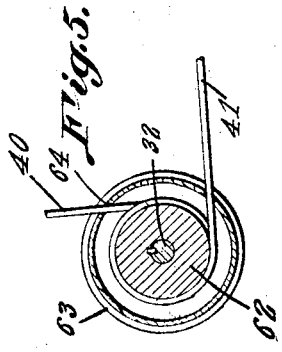

UNITED STATES PATENT OFFICE.

JOSEPH THIES, OF GREAT BEND, KANSAS.

BARGE.

1,353,190.　　　　　Specification of Letters Patent.　　Patented Sept. 21, 1920.

Application filed October 25, 1919. Serial No. 333,414.

*To all whom it may concern:*

Be it known that I, JOSEPH THIES, a subject of the King of Belgium, residing at Great Bend, in the county of Barton and State of Kansas, have invented a new and useful Barge, of which the following is a specification.

The device forming the subject matter of this application is adapted to be employed for receiving and dumping headed grain. A structure of the sort above alluded to is shown in my prior Patent No. 1,293,982, granted Feb. 11, 1919 for sundry improvements in a header barge. The header barge shown in the patent above mentioned includes a cradle adapted to carry the headed grain, the cradle being capable of being raised and lowered, and being so mounted that it may be tilted laterally, to dump its load.

It is the object of the present invention to provide sundry improvements in the means for handling the cradle, and to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Fig. 2 is a front end elevation; Fig. 3 is a rear end elevation; Fig. 4 is a plan disclosing a portion of the frame work of the machine; Fig. 5 is a cross section taken through the drums.

The barge forming the subject matter of this application resembles in some particulars the structure shown in my prior Patent No. 1,293,982 hereinbefore alluded to. Parts of the structure shown in the application may, therefore, be dismissed with a somewhat cursory description, notice being given at the point where the description of what is old terminates, and the description of what is new begins.

The barge forming the subject matter of this application includes a front axle 1 carrying ground wheels 2, and connected by a fifth wheel 3 with a bolster 4. The rear axle appears at 5 and carries ground wheels 6, the rear axle being mounted upon a rear bolster 7. Longitudinal beams 8 are provided, the same being connected at their rear ends with the rear bolster 7, and being connected, adjacent to their forward ends, to a filler 9 mounted on the forward bolster 4. The rear ends of the beams 8 are connected by a tie piece 10, and in front of the tie piece, the beams 8 are connected by a cross bar 11. The beams 8 are connected, further, at points above the bolsters 7 and 4 by transverse members 12, the extremities of which may be connected to the respective bolsters. The vehicle includes a bottom made up of transverse beams 14 mounted on the beams 8. To the foremost beam 14, a front block 15 is secured, a rear block 16 being secured to the rearmost beam 14 of the vehicle. Front standards 17 are erected on the block 15, rear standards 18 being mounted similarly upon the rear block 16. The standards 17 and 18 are connected, respectively, to the foremost and rearmost bottom beams 14 of the vehicle by crossed braces 19, the standards being connected to the ends of the beams 8 by braces 20. The foremost and rearmost bottom beams 14 carry upright tracks 21 connected by yokes 22. The numeral 23 designates, generally, a cradle, adapted to be raised and lowered, and to be tilted transversely, the cradle including a bottom 24, a fixed high side 25, a low side 26, connected by hinges 27 to the bottom 24 so that the low side can swing downwardly and outwardly, and fixed ends 28. The front standards 17 support a seat 29 and a foot rest 30. Bearings 31 are mounted on the rear ends of the beams 8, and in the bearings, a shaft 32 is journaled. Sprocket wheels 33 are carried by the ends of the shaft 32 and coöperate with sprocket chains 34 trained around sprocket wheels 35 connected by clips 36 with the rear wheels 6. Hangers 37 are mounted on the bottom 24 of the cradle 23 and carry pulley blocks 38. Sheaves 39 are journaled on the upper ends of the standards 17 and 18. Rear flexible elements 40 are connected at one end with the rear pulley blocks 38 and are trained through the rear sheaves 39 and through the rear pulley blocks, the flexible elements 40 being downwardly extended. Forward flexible elements 41 are connected to the forward blocks 38 and are trained across the forward sheaves 39, the flexible elements 41 being downwardly extended across idlers 42 carried by any accessible portion of the vehicle frame, the flexible elements 41 being extended rearwardly as indicated at 43. The ends 28 of the cradle 23 are provided with guides 44, adapted to traverse the tracks 21.

Excluding such minor changes as a mechanic or wagon wright might be expected to make, the structure above described is duplicated in my prior Patent No. 1,293,982.

Passing to a description of the mechanisms which are new, wholly or in part, it may be noted that a brake drum 45 is secured to the shaft 32, intermediate the ends thereof, the drum coöperating with a brake band 46, one end of which is connected at 47 to the cross bar 11, the other end of the brake band being connected to a link 48 pivoted to a transverse lever 49 fulcrumed at 50 on an arm 51 projecting forwardly from the member 11. The free end of the lever 49 is pivoted at 52 to a forwardly extended operating rod 53 connected to an upright hand lever 54 fulcrumed at 55 on one of the beams 8, the lever being adapted to coöperate with a keeper 56 connected to one of the front standards 17 and to the foot rest 30. Clutches 57 on the shaft 32 are adapted to connect the sprocket wheels 33 to the shaft. The clutches 57 are operated by levers 58 fulcrumed at 59 on the beams 8. One of the levers 58 is controlled by the link 48, whereas the other of the levers is controlled by a link 60, pivoted to the lever 49.

A drum 61 is fixed to the shaft 32, a similar drum 62 being fixed to the shaft. The drum 62 is located within a hollow drum 63 mounted to rotate on the shaft 32, but adapted to be connected thereto through the instrumentality of a clutch 65 advanced by a spring 66 and retracted by a lever 67 fulcrumed at 68 on the member 11, the lever 67 being under the control of a flexible element 69, extended forwardly and connected to a pedal 70 on the foot rest 30.

The flexible elements 40 and 41 at one side of the machine are wound about the drum 61, the corresponding flexible elements at the other side of the machine being wound about the drum 62, these last specified flexible elements passing through openings 64 in the loose drum 63 in a manner which will be understood clearly when Fig. 5 is noted.

Let it be supposed that the pedal 70 has been depressed, the flexible element 69 tilting the lever 67 on its fulcrum 68, the clutch 65 being operated against the action of the spring 66 to set the hollow drum 63 free, so that the shaft 32 and the drum 62 can rotate with respect to the hollow drum. Suppose, also, that the lever 54 has been operated, the rod 63 actuating the lever 49, the links 48 and 60 operating the levers 58 to couple the sprocket wheels 33 with the shaft 32 through the instrumentality of the clutches 57, the brake band 46 being eased off the brake drum 45. If, now, the vehicle be advanced, the ground wheels 6 will drive the sprocket wheels 35, the sprocket chains 34 transmitting motion to the sprocket wheels 33. The sprocket wheels 33 are coupled to the shaft 32 by the clutches 57, and the shaft 32, therefore, will be rotated. When the shaft 32 is rotated, as aforesaid, the drums 62 and 61 will be rotated, the flexible elements 40 and 41 being reeled upon the drums, the cradle 23 being elevated, without being tilted laterally, because the drums 62 and 61 are of a common diameter. In this way, the cradle 23 may be raised up in a level position. The operator, at any time, may manipulate the hand lever 54 to throw out the clutches 57, thus setting the sprocket wheels 33 free from the shaft 32, the brake band 46, at the same time, being made to engage the brake drum 45. Thus, the operator may stop the elevation of the barge 23, at any point and hold the barge at any elevation to which it may have been raised.

Let it be supposed that, during the raising of the barge 23, the operator desires to tilt the barge laterally. Then the pedal 70 is released, the spring 66 reacts and causes the clutch 65 to couple the hollow drum 63 to the shaft 32. Noting Fig. 5, it will be observed that the flexible elements 40 and 41, at one side of the vehicle, which hitherto have merely slid through the openings 64 while the drum 63 is disconnected from the shaft 32, will now be wound upon the drum 63, since that element is connected to the shaft 32 by means of the clutch 65. The drum 63 is of greater diameter than the drum 61, and when the drum 63 is coupled to the shaft 32, as aforesaid, the flexible elements 40 and 41, at one side of the vehicle, will be reeled in more rapidly than the flexible elements at the opposite side of the vehicle, this operation causing the cradle 23 to tilt laterally and discharge its load. The pedal 70 may be pressed to disengage the clutch 65 from the drum 63, thus setting the drum 63 free, and, if the clutches 57 are manipulated to set the sprocket wheels 33 free from the shaft 32, then the cradle 23 may be eased down, the downward movement of the cradle being regulated by the action of the brake band 46 on the drum 45.

Having thus described the invention, what is claimed is:—

1. In a device of the class described, a vehicle; a ground wheel thereon; a shaft journaled on the vehicle; means under the control of an operator for coupling the wheel to the shaft; first drums fixed to the shaft; a second drum loose on the shaft and inclosing one fixed drum; a vertically movable cradle; flexible elements connected to the first drums and to opposite sides of the cradle and constituting means for raising the cradle, one flexible element passing slidably through the second drum; and means under the control of an operator for coupling the second drum to the shaft.

2. In a device of the class described, a vehicle; a ground wheel thereon; a shaft journaled on the vehicle; first drums fixed to the shaft; a second drum loose on the shaft and inclosing one fixed drum; a vertically movable cradle; flexible elements connected to the fixed drums and to opposite sides of the cradle and constituting means for raising the cradle, one flexible element passing slidably through the second drum; means under the control of an operator for coupling the second drum to the shaft; a brake mechanism controlling the rotation of the shaft; mechanism for connecting the ground wheels to the shaft; and a single member under the control of an operator and operatively connected to both of said mechanisms.

3. In a device of the class described, a vehicle; a shaft journaled on the vehicle; a cradle vertically movable with respect to the vehicle; flexible elements connected to opposite sides of the cradle and constituting means for raising the cradle; means for connecting the flexible elements to the shaft; means loose on the shaft for reeling in one flexible element at a higher speed than that at which the other flexible element is reeled in; mechanism under the control of an operator for coupling the last specified means to the shaft; a ground wheel on the vehicle; and means under the control of an operator for coupling the ground wheel to the shaft.

In testimony that I claim the foregoing as my own, I have hereto affixed my signature in the presence of two witnesses.

JOSEPH THIES.

Witnesses:
JOSEPH F. MAHER,
LORENZO D. STONE.